Oct. 3, 1944.  G. FROVA  2,359,414
APPARATUS FOR SORTING FRUITS
Filed June 30, 1942
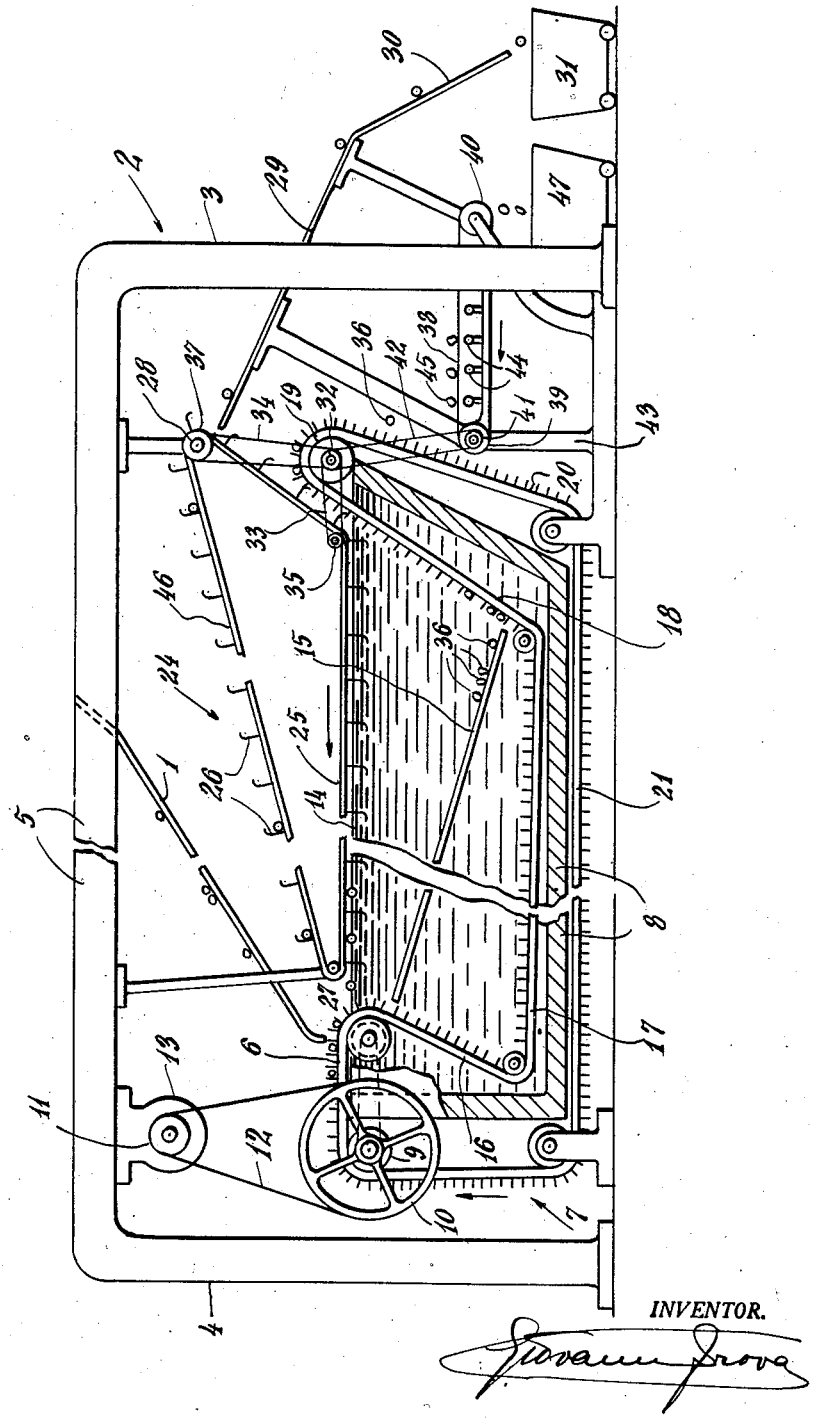
INVENTOR.
Giovanni Frova Patented Oct. 3, 1944

2,359,414

UNITED STATES PATENT OFFICE 2,359,414

APPARATUS FOR SORTING FRUITS

Giovanni Frova, Jackson Heights, N. Y.

Application June 30, 1942, Serial No. 449,116

11 Claims. (Cl. 209—173)

This invention relates to apparatus for sorting perfect pitted cherries, olives and other fruits from unpitted and broken fruits, and further sorting out the unpitted fruits.

The main object of my invention is to provide an apparatus for automatically sorting fruits such as cherries, olives, etc., when pitted to ensure separation of defective fruits from those perfectly pitted as well as to facilitate further separation of unpitted from the defective or broken fruits.

Other objects and the advantages of my invention and its actual use in practice will appear more fully in detail as this specification proceeds.

In order to bring out the salient features of the invention in comprehensible manner and to the best advantage, the same is illustrated in the accompanying drawing forming part hereof, in which the figure in the accompanying drawing is a side elevation of a sorting apparatus embodying the invention, certain parts being broken away to reveal structural detail and relations of parts.

In the drawing, the same references indicate the same or like parts.

In the fruit and berry handling art, and particularly in apparatus for handling such berries and fruits as cherries and the like, certain operations have heretofore been carried out by hand and while others have been effected by separate machines. This has entailed repeated rehandling of the cherries at various stages and the use of a considerable number of attendants. This involves expense, inconvenience, and the use of a great amount of floor space, all of which greatly increases the cost of the final product.

In order to overcome these disadvantages, and particularly with the foregoing objects in view it is now proposed to carry out in a combined machine the entire group of operations required to pit and deliver cherries and the like from the original clusters.

When cherries and other fruits have been pitted, as for example by pitting devices disclosed in my copending application Serial No. 476,702, filed February 22, 1943, it may occur that a few cherries fail to be pitted while another small portion may be imperfectly pitted due to various causes. It is assumed that such pitted, unpitted and broken cherries are deposited or dropped on the chute 1 supported on a frame 2 having rear posts 3 (one shown) and front posts 4 (one shown) and upper horizontal beams 5 (one shown) which directly support the chute. The latter extends to a trough member and the stop member, said chute extending down to a raised horizontal portion 6 of a conveyor generally indicated at 7 operating with portions thereof in a water tank 8 and driven by a roller 9 rotated by a pulley 10 from a pulley 11 through a drive belt 12, pulley 11 being driven by a motor 13 on the frame.

The upper horizontal portion 6 of the conveyor operates at slightly higher level than the level 14 of the water in tank 8, while an inclined partition 15 extends downwardly from a short distance below the water level at the entrance portion of the tank toward the outlet portion in the rear, while a downwardly extending portion 16 and a lower horizontal portion 17 of the conveyor pass beneath said partition and beyond the rear lower end thereof, the upwardly inclined portion 18 of the conveyor rises to pass over roller 19 and then down at 20 and beneath the tank at 21 and thence up again at 22 over roller 9.

As already mentioned the horizontal upper portion 6 of the conveyor 7 receives the pitted cherries from the chute 1 and as this operates toward the right indicated by the arrow within pulley 10 these cherries are fed to the surface 14 of the water upon which all sound pitted cherries will float toward the rear roller 19 above the rear end of the water tank 8. However, a counter-conveyor 24 operating toward the left as indicated by the arrow above the horizontal portion 25 would by virtue of its hooks 26 pick up the floating sound cherries 27 and convey the same upwardly upon its inclined upper stretch 46 toward roller 28 at which point these cherries will be released upon an inclined table 29 having a lower apron 30 allowing the cherries to slide down into a cart 31 for collecting the same. In order to operate conveyor 24, the roller 19 has a pulley 32 provided with belts 33, 34 rotating roller 35 and pulley 37 of roller 28, the roller 19 being of course operated by the conveyor belt 7. Perfect pitted cherries are light and therefore float in water, while broken ones sink, the perfect cherries containing air.

During operation it is possible that some cherries are of such unusual form or have defects so that when they are passed through the machine they are either mutilated and broken or perhaps missed by the pitting devices so that they are not properly pitted, and all such cherries 36 as they fall through chute 1 will upon being deposited upon the water at 14 immediately sink down to partition 15 and gravitate toward the lower end thereof, at which point they will be caught by the upwardly traveling portion 18 of the conveyor and brought over roller 19 and deposited upon a horizontal belt 38 which is preferably made of translucent or transparent material, for example, of cellulose acetate or a derivative thereof, or even a plastic of the vinyl series. This conveyor operates upon a pair of rollers 39, 40, the first having a pulley 41 connected to a pulley 32 of roller 19 by means of a belt 42, the rollers 39 and 40 being supported upon a frame 43, while within the belt is a series of electric lights 44 illuminating said belt from within so that cherries 36 carried forward on said belt in the direction of the arrow immediately above same will be readily inspected by an operator inspecting said belt to discover cherries 45 which still retain their pits. Such cherries will easily be seen because they will be relatively opaque, while the pitted cherries will be translucent. The unpitted cherries 45 can thus be easily picked off and disposed of, while the broken cherries 36 will continue along the belt and drop into collector cart 47.

Having now fully described my invention, I claim:

1. Automatic apparatus for sorting cherries and the like, including a water tank, a conveyor associated with the tank having a portion passing over one edge thereof and thence down into said tank for receiving pitted fruits and depositing the latter upon the water in the tank, further portions of said conveyor rising up to and over the other edge of the tank and thence returning to the first mentioned portion of said conveyor, the portion of the latter rising up to and over said other edge of the tank serving to raise from the bottom of the latter submerged unpitted and imperfect pitted fruits and deliver the raised fruits beyond said other edge of said tank, movable means for picking off floating perfect pitted fruits from the surface of the water in said tank and delivering the latter fruits beyond the tank, and means for driving said conveyor and said movable means.

2. Apparatus according to claim 1, having a baffle or partition disposed in the tank in inclined position sloping down from the first mentioned portion of the conveyor toward the bottom at the opposite far end of said tank.

3. Apparatus according to claim 1, having means facilitating the detection and separation of the unpitted fruits from the broken or imperfectly pitted fruits delivered over the other side of the tank, including a further conveyor extending from a point adjacent to the delivery end of the first conveyor and having a light transmitting conveyor belt and also illuminating means within a portion of the light transmitting belt for illuminating said portion of the latter belt and revealing unpitted fruits thereon in accessible position for manual removal of said unpitted fruits, and drive means for operating said conveyors.

4. Apparatus according to claim 1, wherein the movable means for picking off the perfect pitted fruits from the surface of the water includes a second conveyor disposed above the water and operating with the lower surface portion thereof adjacent to said surface of the water to pick off the floating fruits thereon and extending to a predetermined location beyond the tank to a point of delivery for said fruits.

5. Apparatus according to claim 1, wherein the movable means for picking off the perfect pitted fruits from the surface of the water includes a second conveyor disposed above the water and operating with the lower surface portion thereof adjacent to said surface of the water to pick off the floating fruits thereon and extending to a predetermined location beyond the tank to a point of delivery for said fruits, and having means facilitating the detection and separation of the unpitted fruits from the broken or imperfectly pitted fruits delivered over the other side of the tank, including a further conveyor extending from a point adjacent to the delivery end of the first conveyor and having a light transmitting conveyor belt and also illuminating means within a portion of the light transmitting belt for illuminating said portion of the latter belt and revealing the unpitted fruits thereon in accessible position for manual removal of said unpitted fruits, and drive means for operating said conveyors.

6. Automatic apparatus for sorting fruits, including a water tank, conveyor means associated with the tank having a portion passing over one edge thereof and thence toward the interior of the tank for receiving pitted fruits and depositing the latter upon the water in said tank, further means operable for picking off perfect pitted fruits from the surface of the water and delivering said fruits beyond the tank, means for removing the unpitted and broken cherries from the bottom of the tank, and means for exposing the broken and unpitted fruits to illumination through the fruits to facilitate separation of the unpitted fruits from the broken fruits and means for driving said conveyor and further means.

7. Apparatus according to claim 6, wherein the further means includes an additional conveyor, said apparatus also including further conveyor means ascending from the lower part of the interior of the tank over the other edge thereof for raising from the bottom of said tank submerger unpitted and imperfect fruits and delivering the raised fruits beyond said other edge of said tank.

8. Apparatus for sorting fruits, including a tank adapted to hold water, operable means for picking off perfect pitted fruit deposited upon the surface of the water, conveyor means associated with the tank ascending from the bottom over one edge of said tank for raising submerged unpitted or broken fruit from the bottom of the water and bringing said fruit beyond said tank, and means for exposing the raised unpitted and broken fruits to illumination through the latter fruits to facilitate separation of the unpitted fruits from the broken fruits.

9. Apparatus according to claim 8, wherein the means for exposing the raised unpitted and broken fruits includes illuminating means and an additional conveyor means for carrying said raised fruits past said illuminating means in order to reveal the unpitted fruits in contrast with the broken fruits.

10. Automatic apparatus according to claim 1, in which the means for picking off the perfect pitted fruits from the surface of the water includes a second conveyor disposed above said water and operating with the lower surface thereof running in opposition to the direction of movement of the first mentioned portion of the first conveyor, and extending to a predetermined location beyond the tank to a point of delivery.

11. Automatic apparatus according to claim 1, in which the means for picking off the perfect pitted fruits from the surface of the water includes a second conveyor disposed above said water and operating with the lower surface portions thereof running down along the surface of the water in opposition to the direction of movement of the first mentioned portion of the first conveyor, and extending to a predetermined location beyond the tank to a point of delivery, and a third conveyor extending from beneath the delivery end of the second conveyor and having a translucent or transparent conveyor belt and also illuminating means within said conveyor belt for illuminating the latter and drive means for operating all three conveyors.

GIOVANNI FROVA.